(12) United States Patent
Jenkins et al.

(10) Patent No.: US 12,450,125 B2
(45) Date of Patent: Oct. 21, 2025

(54) AFFINITY-BASED LOAD-BALANCING DISTRIBUTION OF SIMILARITY GROUPS

(71) Applicant: Dell Products L.P., Round Rock, TX (US)

(72) Inventors: Fani Jenkins, Boulder, CO (US); Keyur Desai, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/624,354

(22) Filed: Apr. 2, 2024

(65) Prior Publication Data

US 2025/0307081 A1    Oct. 2, 2025

(51) Int. Cl.
*G06F 11/14*    (2006.01)
*G06F 16/13*    (2019.01)
*G06F 16/174*   (2019.01)

(52) U.S. Cl.
CPC ........ *G06F 11/1453* (2013.01); *G06F 16/137* (2019.01); *G06F 16/1748* (2019.01); *G06F 2201/84* (2013.01)

(58) Field of Classification Search
CPC ............... G06F 11/1453; G06F 16/137; G06F 16/1748; G06F 2201/84
See application file for complete search history.

(56) References Cited

U.S. PATENT DOCUMENTS 11,221,944 B1 *  1/2022  Wang ............... G06F 3/064
2023/0342222 A1 * 10/2023  Mathew ........... G06F 16/182

* cited by examiner

*Primary Examiner* — Tyler J Torgrimson
(74) *Attorney, Agent, or Firm* — Dergosits & Noah LLP; Todd A. Noah

(57) ABSTRACT

A system provides affinity-based load-balancing distribution of similarity groups. A system generates service hash values by applying a consistent hash function to identifiers of deduplication object services. The system maps the deduplication object services to locations where the service hash values map on a hash ring. The system generates, for each of multiple similarity groups, a corresponding group hash value by applying the consistent hash function to a corresponding group identifier. The system assigns, each of the multiple similarity groups, to one of the deduplication object services which is mapped to one of the locations on the hash ring, which is a first successor to a location where the corresponding group hash value maps on the hash ring, thereby enabling each deduplication object service to deduplicate a balanced load of data file segments identified by assigned similarity groups.

20 Claims, 10 Drawing Sheets

AFFINITY-BASED LOAD-BALANCING DISTRIBUTION OF SIMILARITY GROUPS

TECHNICAL FIELD

This disclosure relates to storing digital information, and more particularly, to an affinity-based load-balancing distribution of similarity groups.

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) data file attachment, a data storage system could store all 100 instances of the same 1 MB data file attachment, inefficiently using 100 MB of storage space to store the same 1 MB data file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data file attachment and stores small references to the one stored instance for the 99 subsequent instances.

When being copied from or to a data storage system, a data file or a data object may be divided into data file segments. A data deduplication system can receive data file segments, compare these received data file segments against previously stored data file segments, identify which received data file segments are unique because they have not been previously stored, and store the unique data file segments. When a comparison identifies a received data file segment as a duplicate of a data file segment that has previously been stored as unique, a data deduplication system replaces the duplicate data file segment with a small reference that points to the previously stored data file segment.

A deduplication system typically does not determine whether any such data file segment is a duplicate data file segment or a unique data file segment by directly comparing this data file segment against previously stored data file segments which were previously determined to be unique data file segments. For example, a deduplication system would waste system resources by directly comparing thousands of bytes in each of many data file segments which were formed from a client's data object or data file against thousands of bytes in millions of data file segments which have already been identified and stored as unique data file segments. Instead, a fingerprint may be generated to uniquely identify each data file segment, such as by applying a hash function to create a unique 20-byte fingerprint for each data file segment. Consequently, a deduplication system can conserve system resources by more efficiently comparing 20-byte fingerprints for each of many data file segments formed from a client's data object or data file against 20-byte fingerprints for millions of data file segments which have already been identified and stored as unique data file segments.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
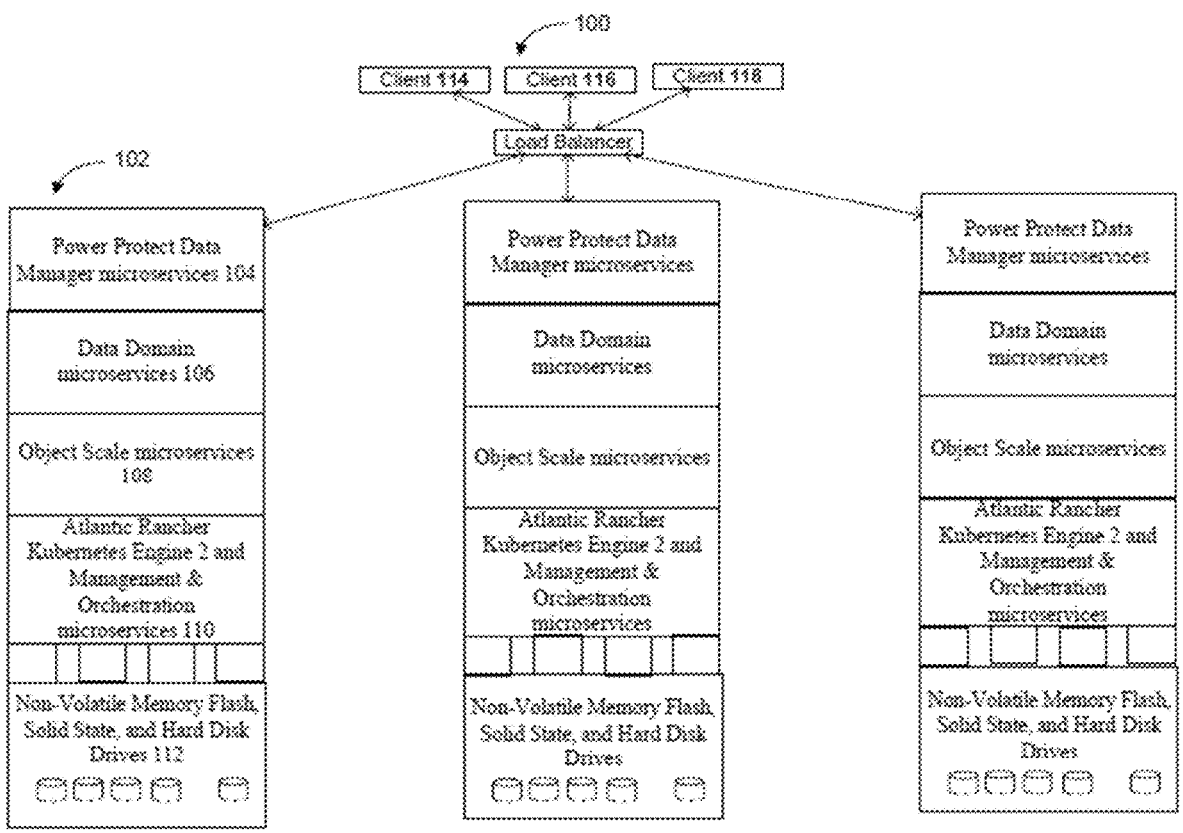
FIG. 1 is a block diagram illustrating parts of an example operating environment for an affinity-based load-balancing distribution of similarity groups according to one or more embodiments of the disclosure.

Rather than using only a single deduplication object service to deduplicate data file segments, multiple nodes in a clustered data protection system can execute its own copy of a deduplication object service in parallel, with each copy of the deduplication object service deduplicating its assigned share of the data file segments, such as four deduplication services each deduplicating approximately one-quarter of the data file segments. Each deduplication object service can store deduplication information about the data file segments which it has deduplicated and use this locally stored information to more efficiently deduplicate similar data file segments which are subsequently received. Therefore, a data protection system can identify various features in data file segments to create groups of similar data file segments, which may be referred to as similarity groups, and then consistently route each similarity group to the deduplication object service which stores local information that enables more efficient deduplication of such a similarity group, such that a deduplication object service may be referred to as owning the similarity groups which has been assigned to the deduplication object service.

If a node or a deduplication object service executing on a node becomes unavailable, a clustered data protection system needs to reassign the similarity groups which were assigned to the deduplication object service or the node to other deduplication object services hosting by other nodes. However, traditional resource distribution algorithms use modular operation which redistributes most of a cluster's resources to new nodes. For example, if one node in a four-node cluster becomes unavailable, 75% of the locally hosted services are reassigned to a different node, such that the transferring of so many similarity groups consumes a significant amount of system resources. Likewise, if a node becomes available, the traditional resource distribution algorithms would redistribute most of a cluster's resources to new nodes, such as 75% of the locally hosted services being redistributed to a different node, once again consuming a significant amount of system resources. Demonstration of the 75% redistribution inefficiencies are described below between the descriptions of FIG. 5 and FIG. 6. Inefficacies of rebalancing resources between nodes also consume significant amount of system resource when attempting to balance workloads between nodes or when redistributing other types of locally stored resources.

In some embodiments, a system (and a computer program product and a method) is described for an affinity-based load-balancing distribution of similarity groups. A system generates service hash values by applying a consistent hash function to identifiers of deduplication object services. The system maps the deduplication object services to locations where the service hash values map on a hash ring. The system generates, for each of multiple similarity groups, a corresponding group hash value by applying the consistent hash function to a corresponding group identifier. The system assigns, each of the multiple similarity groups, to one of the deduplication object services which is mapped to one of the locations on the hash ring which is a first successor to a location where the corresponding group hash value maps on the hash ring, thereby enabling each deduplication object service to deduplicate a balanced load of data file segments identified by assigned similarity groups.

Figure 4A:
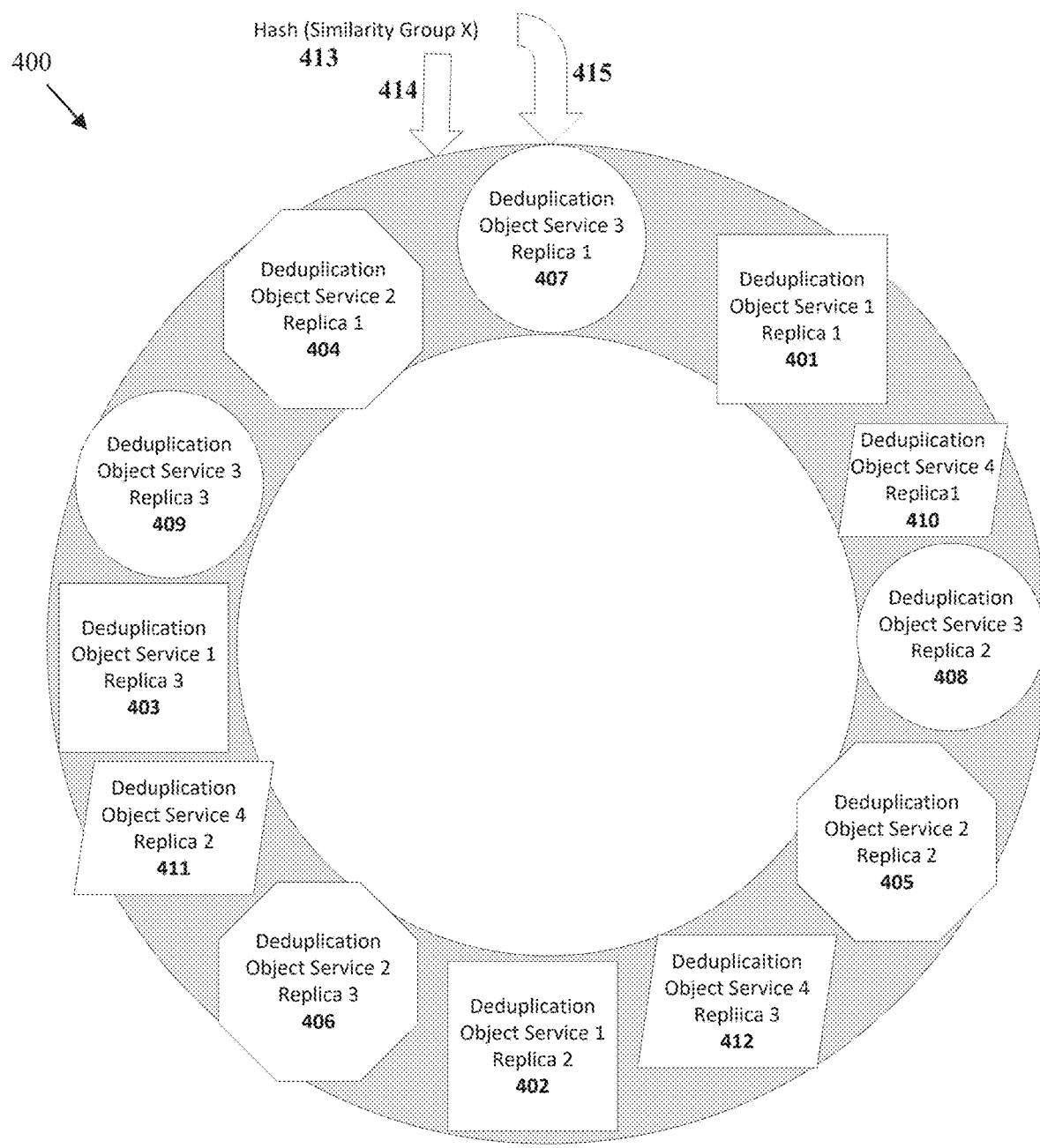
FIG. 4A-FIG. 4E are block diagrams illustrating examples of hash rings for an affinity-based load-balancing distribution of similarity groups according to one or more embodiments of the disclosure.
Figure 4B:
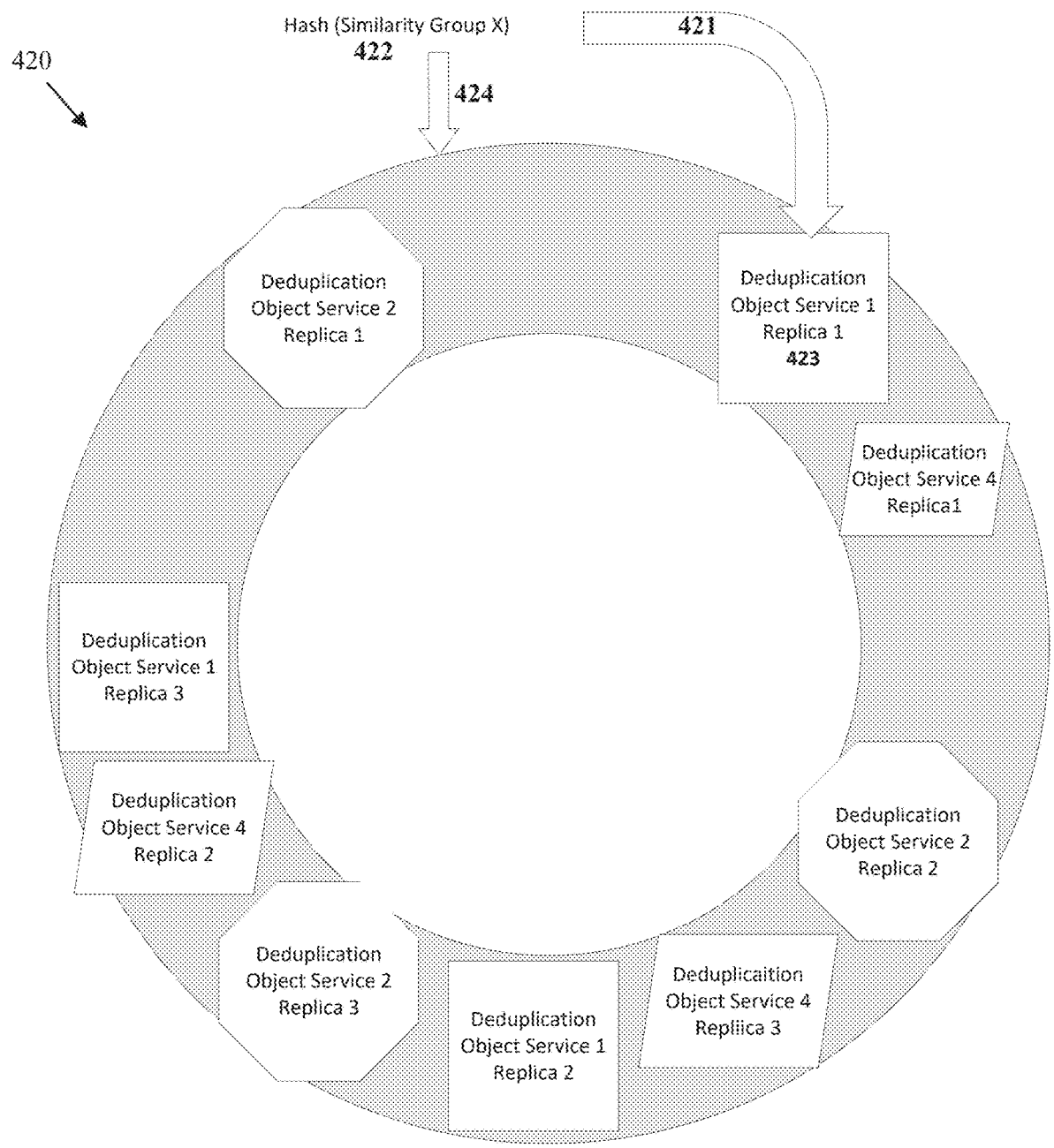
Figure 4C:
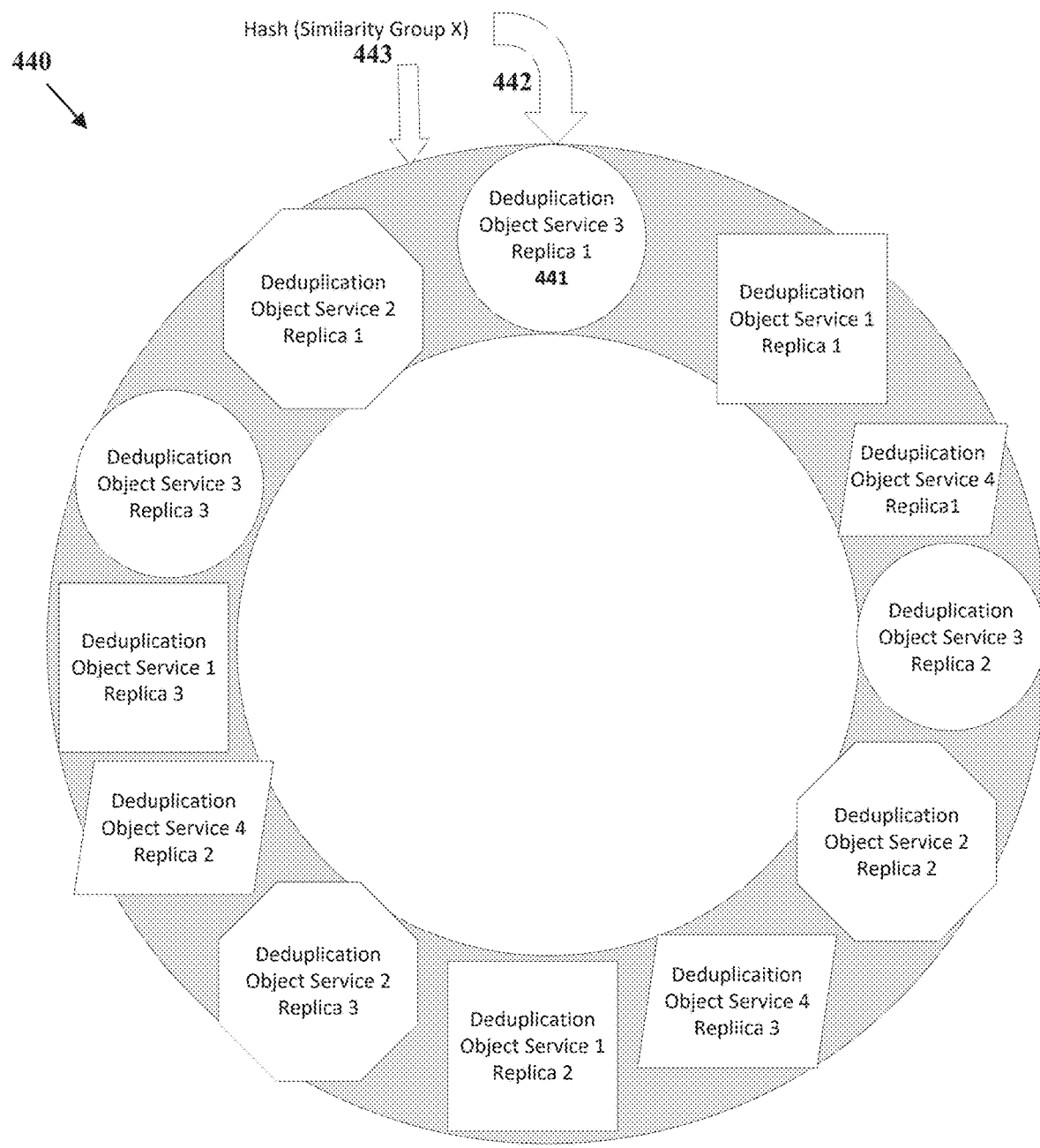

For example, a data protection platform generates service hash values by applying a consistent hash function to the identifiers of deduplication object service 1 and its replicas, deduplication object service 2 and its replicas, deduplication object service 3 and its replicas, and deduplication object service 4 and its replicas. The data protection platform maps the deduplication object services 1-4 and their replicas to 12 locations on a hash ring which correspond to the service hash values hashed from the identifiers for deduplication object services 1-4 and their replicas, as depicted by FIG. 4C, which is described in more details below in reference to FIG. 4C. The data protection platform generates a group hash value by applying a consistent hash function to the identifier of similarity group X, and for each of the identifiers of more than 1,000 similarity groups. The data protection platform assigns similarity group X to deduplication object service 3 replica 1 which is mapped to the location on the hash ring which is the first successor to the location on the hash ring where the group hash value was mapped for the similarity group X, and likewise more than 1,000 similarity groups are assigned to the deduplication object services 1-4, which are not depicted by FIG. 4C.

The data protection platform responded to node 3 returning to availability on a cluster of nodes which had balanced the distribution of 1,024 similarity groups equally among the 3 cluster nodes, by rebalancing the distribution of the 1,024 similarity groups equally among the 4 cluster nodes. The data protection platform relocated only the similarity groups that had been originally assigned to node 3, so that these similarity groups would have access to their locally stored metadata once again, without needing to reference any records of which similarity groups were assigned to node 3, and without reassigning any of the 1,024 similarity groups which had always been assigned to nodes 1, 2, or 4. After rebalancing the distribution of 1,024 similarity groups between nodes 1-4, each of the nodes 1-4 are enabled to deduplicate a balanced load of data file segments identified by their similarity groups.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

Any of the client devices can take the form of software, physical machines, or virtual machines, or any combination thereof, though no particular device implementation or configuration is required for any embodiment. Similarly, data protection platform components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data file segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

An example of parts of a data protection platform's architecture 100 is described herein with reference to FIG. 1. At least some functionality may be provided by, or implemented in connection with, various data protection platforms provided by Dell Technologies, and associated systems, methods, and components, although the use of these particular platforms is provided only by way of illustration and is not required. FIG. 1 depicts a high-level overview of an example three-node cluster architecture for a data protection platform 100. Each node, such as node 102, consists of Power Protect Data Manager (PPDM) microservices 104, Data Domain microservices 106, Object Scale microservices 108, Atlantic Rancher Kubernetes Engine 2, Management & Orchestration microservices 110, and Non-Volatile Memory Flash, Solid State, and Hard Disk Drives 112 to serve the client's 114-118. As more nodes are added, the data protection platform 100 scales Central Processing Units (CPU), Random Access Memory (RAM), storage, and networking accordingly.

Figure 2:
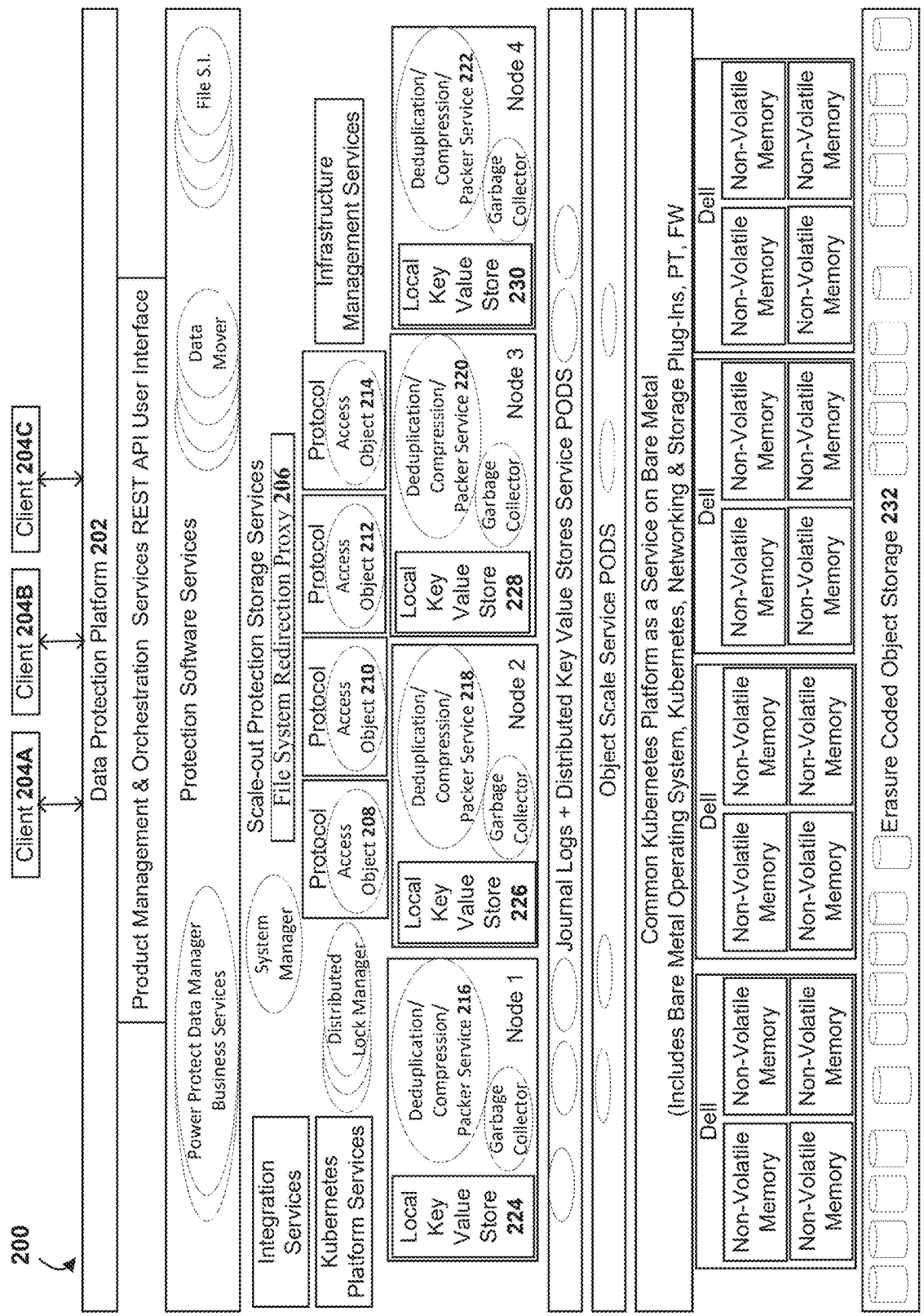
FIG. 2 is a block diagram illustrating an example operating environment for an affinity-based load-balancing distribution of similarity groups according to one or more embodiments of the disclosure.

FIG. 2 depicts an integrated system architecture 200 for a data protection platform 202, which uses a Power Protect Data Manager to provide backup software functionality, according to one or more embodiments of the disclosure. A clustered storage system, as further described herein, may store backup data (backup data files or backup data objects) within a one or more nodes, as further described herein, and also store metadata for (or associated with) the backup data, and one or more instances of the data file system that catalogs backup data files and other data residing in the clustered environment. In general, the storage of the backup data may be configured to store data backups for the clients 204 A-C, which may be restored in the event of a loss of data. The clustered storage system may be an object storage system that includes object storage, as further described herein.

The data protection platform 202 may include a file system redirection proxy 206 which functions as a load balancer for the clients 204A-C by redirecting file operations in a consistent manner based on a hash of the file handle, path, or other properties to instances of access object services or micro-services 208-214, which may be referred to as the access object services 208-214, and which direct data to deduplication/compression/packer object services or micro-services 216-222, which may be referred to as deduplication object services 216-222, and to local key value stores 224-230 and object storage 232. By redirecting file operations in a consistent manner based on a hash of the file handle, path, or other properties to instances of access object services 208-214, the file system redirection proxy 206 ensures that the same file always gets routed to the same instance of the access object services 208-214. The access object services 208-214 handle protocols, the file manager/directory manager, the distributed namespace, and the content store module, which means that files are segmented and the access object micro-services 208-214 construct the Merkle tree, or LP tree, as described below. FIG. 2 depicts the data protection platform 202 with three clients 204A-C, one file system redirection proxy 206, four access object services 208-214, four deduplication object services 216-222, and four local key value stores 224-230. However, the data protection platform 202 may include any number of the clients 204A-C, any number of the File System Redirection Proxy 206, any number of the access object services 208-214, any number of deduplication object services 216-222, and any number of local key value stores 224-230.

Each of the deduplication object services 216-222 may be a single service, or may include a deduplication service for deduplicating incoming data, and a compression service and a packer service for storing the deduplicated data in object storage. The access object services 208-214 and the deduplication object services 216-222 scale independently in order to balance the load across the whole cluster.

The data protection platform 202 uses a distributed key value store to hold much of the metadata, such as the namespace B-tree and the LP tree stored by the access object micro-services 208-214. The data protection platform 202 can insert fingerprints into and query the fingerprints in the key value store. The distributed key value store also holds the fingerprint index and container fingerprints, which are executed as containers within the cluster of nodes and are stored to low latency media such as flash memory. The data protection platform 202 can also use a distributed and durable log to store backup data and metadata, achieve high availability by using erasure coded storage (ObjectScale) for data reliability, and offer non-disruptive upgrade that enables customers to consume new capabilities faster and without disruption.

L6 Files or Objects, L1 Segments, & L0 Compression Regions

Figure 3:
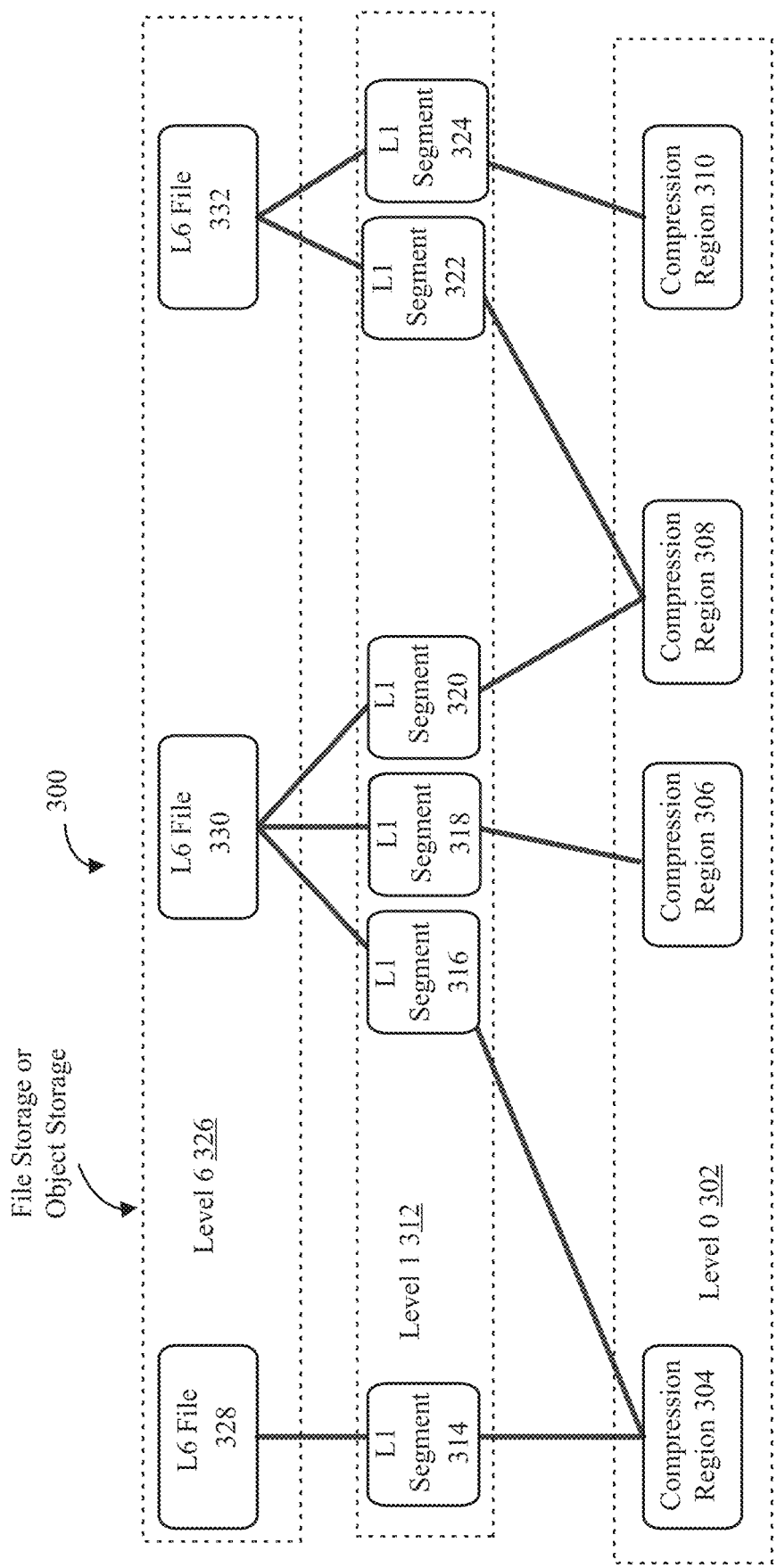
FIG. 3 is a block diagram illustrating relationships between L6 files or objects, L1 segments, and L0 compression regions for an affinity-based load-balancing distribution of similarity groups according to one or more embodiments of the disclosure.

FIG. 3 depicts that a portion or all of a data file or data object may be represented by a Merkle tree 300 with the bottom level of the Merkle tree 300 representing the data file segments, which may be referred to as level 0 data file segments or Level 0 302 data file segments, which may include compression regions 304-310. Each compression region may store unique data file segments that have been compressed and each compressed data file segment's corresponding unique fingerprint and data file segment size. Large numbers of sequential fingerprints generated for sequential data file segments, may be grouped together at the next higher level of the Merkle tree 300 to form groups of fingerprints for data file segments, which may be referred to as a level 1 segment or a L1 segment.

Hundreds of the fingerprints, of the groups of data file segments, that form L1 segments, may be grouped together and hashed as level 2 fingerprints or a L2 segment, and this process of grouping and hashing fingerprints for increasingly larger groups of fingerprints may continue up to level 6 or L6, which represents the entire data file or data object. The top of a Merkle tree 300 is referred to as an L6 file or object, even though it may actually refer to fingerprints for groups of data file segments in a lower numbered level. Fingerprints for segments which are above L0 may be referred to as LP segments, such that the Merkle tree 300 may be referred to as an LP tree.

FIG. 3 depicts a portion of data file storage or the object storage that may be represented by Level 1 312, which may include L1 segments 314-324. Each L1 segment may store metadata that identifies the data object or data file to which a particular L1 segment belongs, a reference to a similarity group identifier, a fingerprint array that stores those fingerprints included in a L1 segment, and the sizes of each data file segment represented by each fingerprint. FIG. 3 depicts that a portion of data file storage or object storage may be represented by Level 6 326, which may include L6 files 328-332.

Since either a sequence of a data file's segments or a sequence of the data file segments' fingerprints may be used for forming a L1 segment and/or determining a similarity group identifier, a source can send these fingerprints without sending these data file segments when L1 segments are to be formed and similarity group identifiers are to be determined. The feature value for a data file segment for forming a L1 segment (such as a hash of the first 64 bytes of the first data file segment for forming a L1 segment) may be used as the basis for determining a similarity group identifier that the access object micro-services 208-214 use to route the L1 segment to the appropriate one of the deduplication object services 216-222. Using a hash of a representative portion of a data file segment as a similarity group identifier can result in L1 segments for data that are similar, but not identical, to be routed by the access object micro-services 208-214 to the same one of the deduplication object services 216-222 that is uniquely responsible for each L1 segment which has a similarity group identifier that is within a range of similarity group identifiers. The net effect of such routing may be to improve deduplication while increasing skew. The similarity group identifier is checked against a mapping table, which leads to consistently routing the L1 segment based on its similarity group identifier to an instance of the deduplication object service.

If each similarity group identifier is in the range of 0 to 1,023, and there are four instances of the deduplication object services 216-222, these four instances may uniquely be responsible for the similarity group identifiers in the ranges 0 to 255, 256 to 511, 512 to 767, and 768 to 1023, though other mappings are possible. An instance of the deduplication object services 216-222 will use the other fingerprints within the same similarity group to deduplicate the fingerprints which correspond to the L0 segments. Other functionality exists in the deduplication object service, such as compressing data file segments into compression regions, containers, and blobs that will be packed into an object written to an underlying object storage, such as object scale or an object store.

In order to load-balance storage and compute resources and in turn scale the performance linearly, a cluster of nodes execute access object micro-services 208-214 that use similarity group identifiers to route user data across the deduplication object services 216-222, which are responsible for deduplicating sets of similarity groups. An instance of the access object micro-services 208-214 computes a similarity group identifier for a chunk of data, which may be referred to as a similarity unit, and routes this unit of data to an instance of the deduplication object services 216-222 which owns similarity groups. Once the data lands on the appropriate instance of the deduplication object services 216-222, the data is deduplicated and compressed, logged to the distributed log, and eventually written to ObjectScale in the form of 16 MB objects, which may be referred to as blobs, while updates to the corresponding metadata are stored in the key value store in flash memory.

The deduplication object services 216-222 depend on low latency access for metadata operations. For example, an instance of the deduplication object services 216-222 performs inline deduplication of fingerprints created for the incoming data by issuing a fingerprint index lookup corresponding to a particular similarity group identifier. This fingerprint index lookup may be served from several locations, listed here in the order of a low latency location to a medium latency location to a high latency location.

The fastest access is from the fingerprint index hash table, which is an in-memory fingerprint cache. After receiving fingerprints from any of the clients 204A-C, a selected instance of the deduplication object services 216-222 can check each newly received fingerprint against the in-memory fingerprint cache, which stores the most recently used fingerprints for the selected instance of the deduplication object services 216-222. If one of the newly received fingerprints is in the fingerprint cache, the selected instance of the deduplication object services 216-222 can determine that this newly received fingerprint is a duplicate, and therefore the data file segment represented by this newly received fingerprint is also a duplicate, such that this newly received fingerprint does not need to be stored again in any fingerprint index and the corresponding data file segment does not need to be stored again in the object storage 232. Since this in-memory fingerprint index hash table access is memory intensive, the expectation is to load-balance the similarity groups across all the nodes in the cluster in order to take advantage of all the available compute capabilities in the cluster.

If a match is not identified between a fingerprint created for the incoming data and any fingerprints in the fingerprint index hash table in cache, then the data protection platform 202 issues a fingerprint index lookup against the on-disk short fingerprint index stored in the local key value store (local non-volatile memory). Instead of storing the full fingerprints in the local on-disc fingerprint index which is queried to determine whether a selected fingerprint is a duplicate, the data protection platform 202 may use short versions of the fingerprints involved in the deduplication process. For example, the deduplication object service 216 can compare the first 8 bytes of a fingerprint received from the stream of fingerprints against the first 8 bytes stored in the local on-disc fingerprint index for each of the fingerprints which were just identified as not matching any of the fingerprints in the fingerprint cache, and therefore continuing to be processed as if these fingerprints are unique fingerprints and which may be stored in object storage 232 or in non-volatile flash memory. There is an expectation that index lookups from a local on-disk short fingerprint index will be very fast and will be served from a non-volatile memory on the local node instead of being served from another node via a remote procedure call.

If a match is not identified between a fingerprint created for the incoming data and any fingerprints in the fingerprint index hash table in cache, or any fingerprints in the on-disk short fingerprint index stored in the local key value store (local non-volatile memory), then the data protection platform 202 issues a fingerprint index lookup against the on-disk full fingerprint index stored in the S3 key value store (Object Scale). The data protection platform 202 attempts to avoid these slow accesses because performing index lookups against this full fingerprint index results in a significant reduction in performance.

The deduplication object services 216-222 write and read the container metadata (CMETA), which has a very large storage footprint, around 1 TB per node, via the distributed key value store during container writes and reads for filtering, deduplication, and restore operations. Since the container metadata resides in the distributed key value store, which replicates its data N-ways, the distributed key value store uses the raft protocol to elect a leader node and follower nodes among the instances of the distributed key value store. All container metadata accesses for a particular similarity group must go through the leader node. If the leader node for the container metadata of a particular similarity group does not match with the node where the instance of the deduplication object services 216-222 that owns the similarity group is executing, the data protection platform 202 needs to issue a remote procedure call to a different node to read the container metadata.

Depending on how similarity groups are created and depending on the customer workload, some similarity groups may receive significantly more data compared to other similarity groups, which can cause hot spots in the cluster. For example, on a 4-node cluster with 1,024 similarity groups, the 1,024 similarity groups may be distributed equally between the similarity groups across all 4 nodes or across all four deduplication object services 216-222 which are distributed evenly across all four nodes. However, if some nodes own or are responsible for similarity groups that receive significantly more data than the data received by similarity groups that other nodes own or are responsible for, the high compute load on those numerically overloaded nodes may eventually cause a performance reduction. In addition, more data and metadata operations may be generated from those numerically overloaded nodes, and that can put stress on the key value storages, the distributed log, and ObjectScale components.

Additionally, if an instance of the deduplication object services 216-222 leaves cluster membership, and then rejoins the cluster again, the returning node may not own the same set of similarity groups which the returning node used to own before this node temporarily left the cluster. If an instance of the deduplication object services 216-222 is responsible for owning a particular similarity group which is executing on a node which is different from the node where the (Raft) leader for that similarity group is executing, each access to the distributed key value store's metadata will suffer from a cross-node remote procedure calls.

The data protection platform 202 solves the problem of how to load balance the workload across a cluster of nodes, without sacrificing performance in the presence of hot-spots or cluster reconfiguration events such as services or nodes being removed from or being added to the cluster. The data protection platform 202 also provides affinity-based distribution of similarity groups, so that each similarity group is affined to a particular node where the metadata for this similarity group is stored, significantly increasing the probability of co-locating the raft leader node and the instance of the deduplication object services 216-222 that owns the corresponding similarity group. If each similarity group is reassigned to the node where the similarity group can locally access its previously stored metadata, such as the 1 TB of container metadata, the need to make expensive remote procedure calls can be significantly reduced.

The similarity group controller service is responsible for managing similarity group ownership. On every join and leave event of a deduplication object services 216-222, a similarity group distribution algorithm is executed, and similarity groups are assigned to individual deduplication object services 216-222. The similarity group distribution algorithm utilizes the following techniques in a novel way: Consistent hashing is a hashing technique where n is the number of keys (similarity group) and m is the number of buckets (deduplication object services 216-222), such that when a hash table is resized, only n/m keys need to be remapped on average. In contrast, in most traditional hash tables, a change in the number of buckets causes nearly all keys to be remapped because the mapping between the keys and the buckets is defined by a modular operation.

This technique is particularly useful for the data protection platform 202 because a join or leave of any of the deduplication object services 216-222 requires only n (number of keys) divided by m (number of slots} similarity groups to be re-shuffled when the number of deduplication object services 216-222 change. In addition, the result of the similarity group distribution is the same, irrespective of the order of deduplication object services 216-222 joining or leaving the cluster. The data protection platform 202 also enables replication in the consistent hash ring. Based on the number of a replication factor, a deduplication object services 216-222 will be repeated in the hash ring that number of times, which allows a more uniform distribution of similarity groups.

This data protection platform 202 uses a similarity group identifier affined to a particular node where the on-disk short fingerprint index for this similarity group identifier is stored. What this means is that if an instance of the deduplication object services 216-222 (or a corresponding node) restarts, and the corresponding similarity group was moved to another instance of the deduplication object services 216-222, when the instance of the deduplication object services 216-222 that originally owned the similarity group rejoins the cluster, the instance of the deduplication object will once again become the owner of the similarity group.

The mapping of similarity groups to deduplication object services 216-222 is maintained by a similarity group controller service, which maintains a table of similarity groups and their ownership by deduplication object services 216-222. A data protection platform's cluster will always contain a static number of similarity groups, such as 1,024 similarity groups, which will be distributed among a set of deduplication object services 216-222. For example, if there are only 2 deduplication object services 216-222 services actively executing in the cluster, half of the similarity groups will be owned by the first instance of the deduplication object services 216-222 while the other half of the similarity groups will be owned by the second instance of the deduplication object services 216-222. If a node is added or removed from the cluster, the rebalancing distribution of the similarity groups should be optimized to minimize the number of similarity groups which are moved between nodes, so only a small subset of the similarity groups should be impacted in such an event. A systematic recovery process can help to ensure that local metadata such as the short fingerprint index is still available in the same local storage for the same set of similarity groups.

This disclosure's new and improved similarity group distribution algorithm creates a consistent hash ring that enables replication. The similarity group distribution algorithm can use a consistent hash function to hash the identifiers of the deduplication object services 216-222 to service hash values which are mapped to locations on the consistent hash ring. FIG. 4A depicts an example of a replication-enabled consistent hash ring 400 with 4 deduplication object services 216-222, which are represented as squares for the deduplication object service 1 and its replicas 401-403, represented as octagons for deduplication object service 2 and its replicas 404-406, represented as circles for deduplication object service 3 and is replicas 407-409, and represented by parallelograms for deduplication object service 4 and its replicas 410-412.

Then the similarity group distribution algorithm uses the consistent hash function to hash the identifiers of all similarity groups to group hash values that are mapped to locations on the same consistent hash ring 400, such as the identifier of the similarity group X 413 is hashed to a service hash value that is mapped to a location 414 on the consistent hash ring 400. For each similarity group, the similarity group distribution algorithm identifies one of the deduplication object services 1-4 that is mapped to a location that is the successor of the location mapped to by the group hash value of the identifier of similarity group X 413 on the consistent hash ring 400, which is the location mapped by the next deduplication object service on the hash ring 400 when proceeding clockwise from the location mapped to by the group hash value of the identifier of similarity group X 413. In FIG. 4A, the similarity group X 413 is assigned 415 to deduplication object services 3 407.

When any of the deduplication object services 216-222 leaves the cluster, the similarity group distribution algorithm removes the deduplication object service 3 from the consistent hash ring 420, such as depicted by FIG. 4 B. When the deduplication object service 3 is no longer present in the cluster, the similarity group distribution algorithm assigns 421 similarity group X 422 to the next deduplication object service 1 423, which is the location mapped by the next deduplication object service 1 423 on the hash ring 420 when proceeding clockwise from the location 424 mapped to by the group hash value of the identifier of similarity group X 422. The similarity group distribution algorithm always proceeds clockwise on each hash ring or always proceeds counter-clockwise on each hash ring.

When the same deduplication object service 3 rejoins the cluster, the similarity group distribution algorithm adds it to the consistent hash ring 440, as depicted by FIG. 4C. When deduplication object services 3 441 is back in the cluster, the similarity group distribution algorithm reassigns 442 similarity group X 443 to deduplication object service 3 441.

Figure 4D:
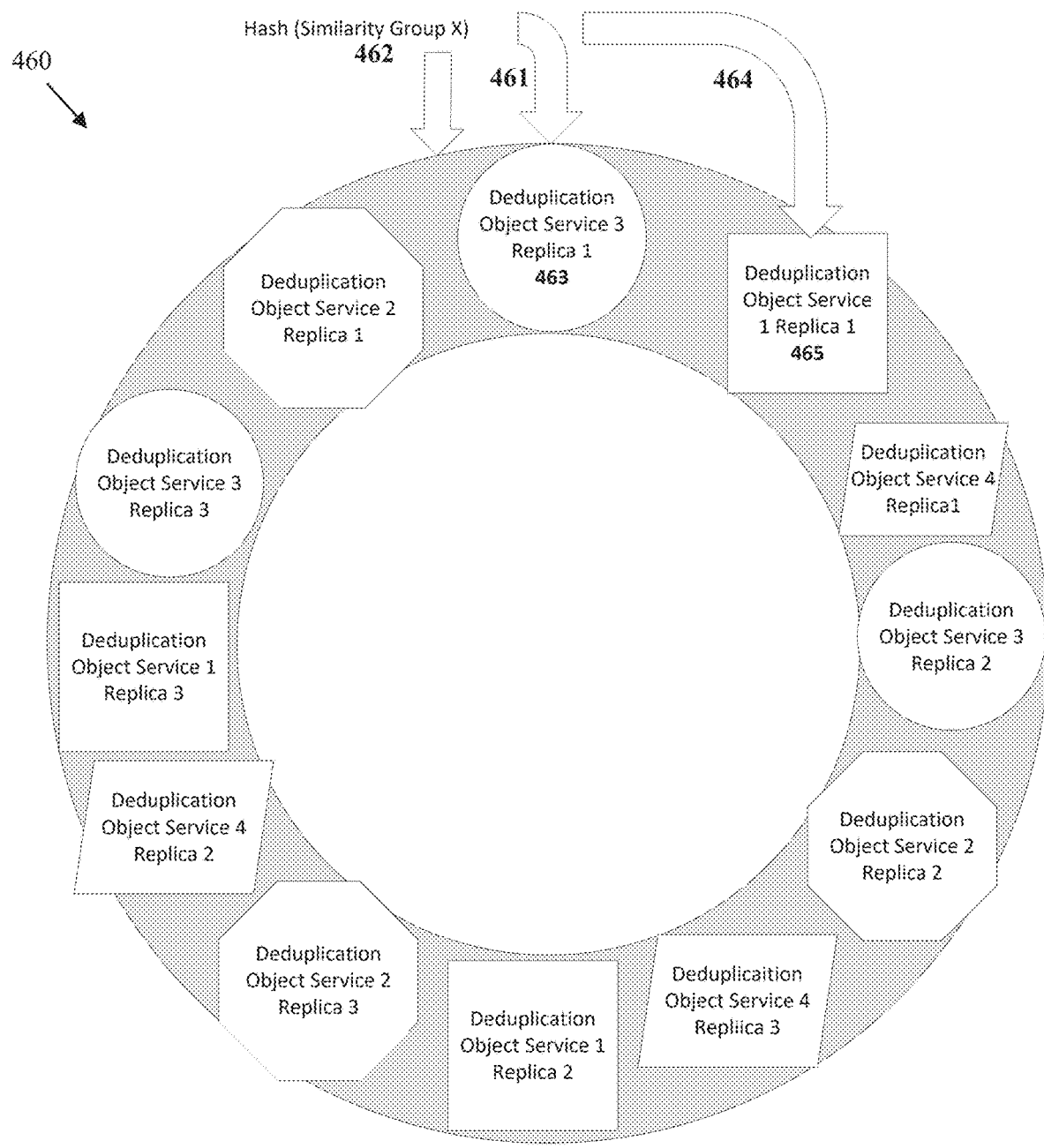

As depicted by FIG. 4D, after the similarity group distribution algorithm initially assigns 461 similarity group X 462 to the deduplication object service 3 463 which then owns the similarity group X 462, the similarity group distribution algorithm determines whether the deduplication object service 3 463 is executing on a node that stores metadata for the similarity group X 462. The similarity group distribution algorithm attempts to co-locate the deduplication object service 3 463 that is the owner of the similarity group X 462 and the nodes that store metadata for the same similarity group X 462 on the same node. To accomplish this, the distributed key value store provides a node affinity hint in the form of a list that includes a leader node and several follower nodes that store metadata for the similarity group X 462.

With this information, the similarity group distribution algorithm can select one of the N deduplication object services 216-222 that resides on one of the N nodes that store metadata for the similarity group X 462, when assigning the similarity group X 462 to one of the deduplication object services 216-222. If the selected node is also the leader node, then the similarity group distribution algorithm and key value store are aligned. Otherwise, if the selected node is not also the leader node, then the similarity group distribution algorithm notifies the distributed key value store of which node the similarity group distribution algorithm chose, so that key value store can make that node the leader of the similarity group X 462.

The similarity group distribution algorithm hashes the similarity group X 462, which results in selecting one of the deduplication object services 1-4 as a potential owner of the similarity group X 462. FIG. 4 D depicts that the similarity group distribution algorithm selected one of the deduplication object services 1-4 as the owner for similarity group X 462 as a first step. If the selected deduplication object service is not present in the node affinity hint given by the distributed key value store, the similarity group distribution algorithm can continue iterating clockwise over the consistent hash ring 460 until it finds one of the deduplication object services 1-4 which is present in the node affinity hint. FIG. 4D depicts an example where the selected deduplication object service 3 463 is absent from the node affinity hint for similarity group X 462 while the deduplication object service 1 465 is present in the node affinity hint for similarity group X 462. The similarity group distribution algorithm will skip over the absent deduplication object service 3 463 in the consistent hash ring 460 and select 464 the present deduplication object service 1 465 as the owner of this similarity group X 462.

As mentioned above, some similarity groups may receive significantly more data compared to the amount of data received by other similarity groups, which can cause hot spots in the cluster. Each of the deduplication object services 216-222 can continuously measure its load, such as input/output data operations per second, or indirectly measure its workload by recording how often input queues are overloaded and report whether it is overloaded or not. The data protection platform 202 can store information on the loads of the deduplication object services 216-222, including the identifiers of those which are overloaded.

Hot spots can occur when deduplication object services 216-222 are getting more load than they are sized to handle due to receiving data from very busy similarity groups. To relieve such overloaded deduplication object services 216-222 from some of the load, the similarity group distribution algorithm can assign some of their similarity groups to other deduplication object services 216-222 which are less loaded. Therefore, after the similarity group distribution algorithm initially assigns 461 similarity group X 462 to the deduplication object service 3 463 which then owns the similarity group X 462. Next, the similarity group distribution algorithm determines whether the deduplication object service 3 463 is executing on a node that stores metadata for the similarity group X 462.

Many use cases of the claimed features begins with the similarity group distribution algorithm selecting 481 the deduplication object service 3 482 as a potential owner of the similarity group X 483, as depicted by FIG. 4 E. Next, the similarity group distribution algorithm considers the node affinity hint provided by the distributed key value store for the deduplication object service 3 482, and then, if needed, updates the selected deduplication object service 3 482. For the purpose of this example, the deduplication object service 3 482 is present in the node affinity hint, and the deduplication object service 3 482 remains the selected owner of the similarity group X 483 at this step of the similarity group distribution algorithm.

Next, if the selected deduplication object service 3 483 is on the deduplication object services overloaded list, the similarity group distribution algorithm determines whether to offload this most recently assigned similarity group X 483 to the next deduplication object service on the consistent hash ring 480. Then the similarity group distribution algorithm can assign 484 the similarity group X 483 to the underloaded deduplication object service 1 485, and still assign some of the similarity groups to the overloaded deduplication object service 3 482, but not as many as the similarity group distribution algorithm would have originally assigned.

Figure 4E:
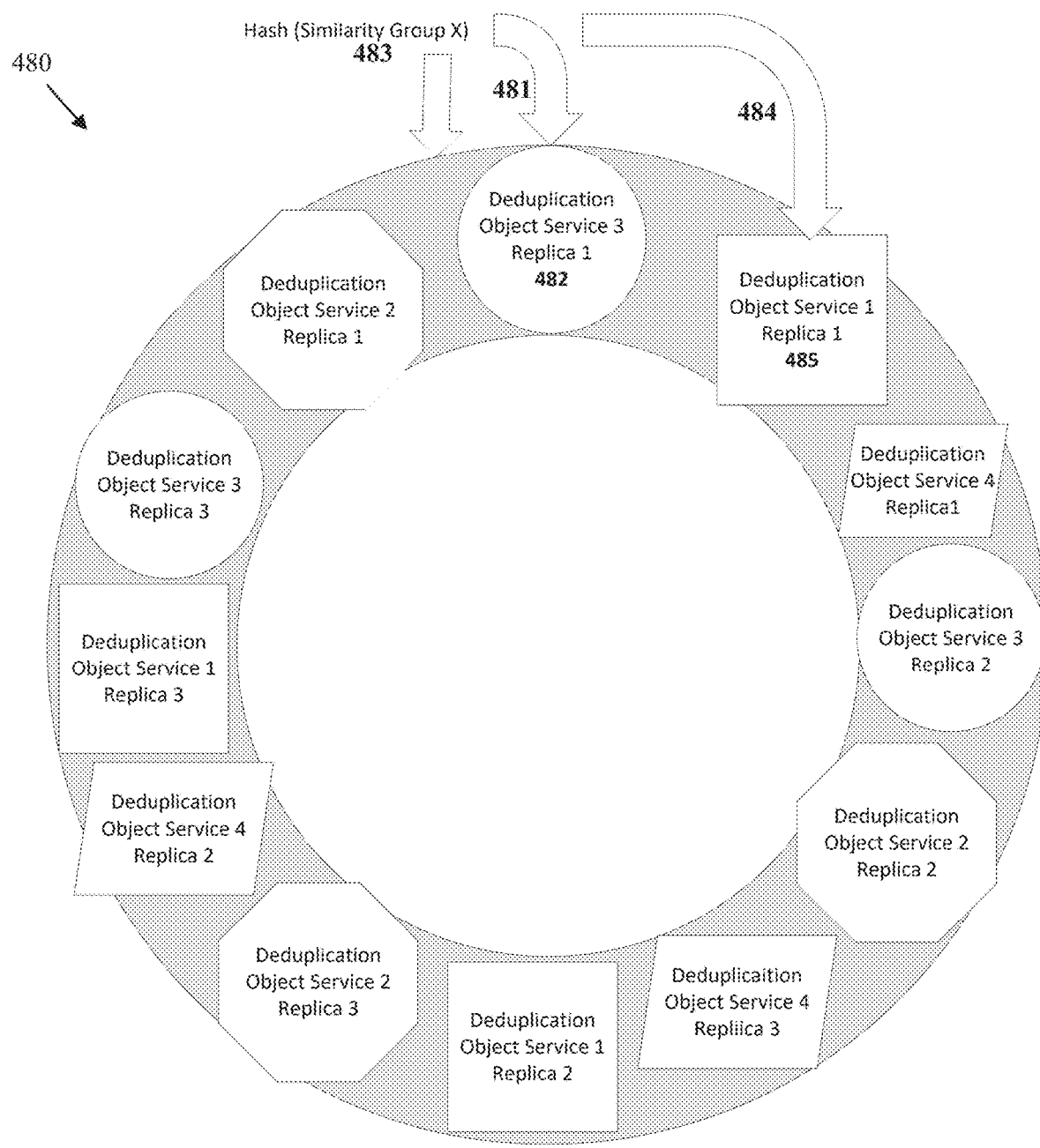

The number of similarity groups to offload can be based on a heuristic which can take into account the current loads on each of the similarity groups that are resident on each of the nodes and a stability factor that favors maintaining configurations as they currently exist, to counterbalance any tendency for the similarity group distribution algorithm to optim8ze every execution of every available application. FIG. 4E depicts an example where the deduplication object service 3 482 is present on the deduplication object services overloaded list, and similarity group X 483 is chosen to be offloaded. The similarity group distribution algorithm will skip over deduplication object service 3 482 in the consistent hash ring 480 and select 484 the deduplication object service 1 485 as the owner of this similarity group X 483.

Figure 5:
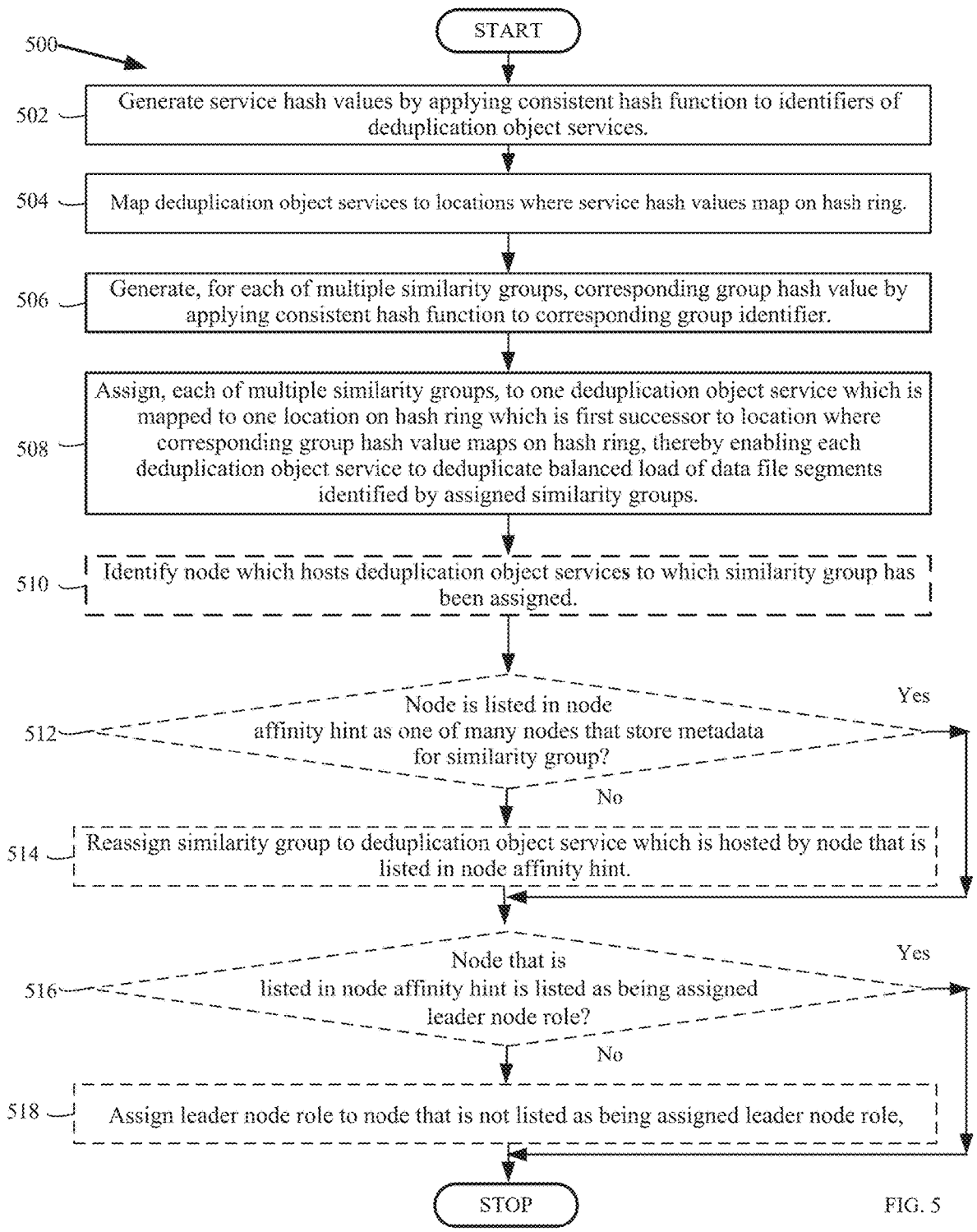
FIG. 5 is a block diagram illustrating an example method for an affinity-based load-balancing distribution of similarity groups according to one or more embodiments of the disclosure.

FIG. 5 depicts a flowchart 500 that illustrates a method for an affinity-based load-balancing distribution of similarity groups, under an embodiment. The flowchart 500 illustrates method acts as flowchart blocks for certain steps involving the clients 204A-C and/or the data protection platform 202 of FIG. 2.

Service hash values are generated by applying a consistent hash function to identifiers of deduplication object services, block 502. The system hashes identifiers of deduplication object services to generate values for mapping the services to a hash ring. For example, and without limitation, this can include the data protection platform 202 generating service hash values by applying a consistent hash function to identifiers of deduplication object service 1 and its replicas, deduplication object service 2 and its replicas, deduplication object service 3 and its replicas, and deduplication object service 4 and its replicas.

A service hash value can be data of a fixed size which is mapped from data of an arbitrary size which is associated with the action of assistance. A consistent hash function can be a special kind of an algorithm that maps data of arbitrary size to a number of keys of fixed size data that correspond to number of array slots, yet when the number of array slots are changed, the majority of the keys do not need to be remapped. An identifier can be a sequence of characters used to refer to an entity. A deduplication object service can be an entity that eliminates redundant information from information that is to be stored.

Generating the service hash values may be in response to an additional identifier of a deduplication object service being associated with an unavailability status. For example, the data protection platform 202 responds to a previously existing deduplication object service being identified as becoming unavailable in the cluster nodes which hosts the deduplication object service 3, which has been available for the cluster of nodes, such that the similarity groups for the nodes in the cluster need to be rebalanced to compensate for the loss of the capacity of the unavailable deduplication object service, during the transition that occurs between the hash ring 400 depicted by FIG. 4A and the hash ring 420 depicted by FIG. 4B. An unavailability status can be a position at a particular time of being unable to be used or obtained.

Generating the service hash values may be in response to one of the identifiers of deduplication object services becoming associated with an availability status. For example, the data protection platform 200 identified when node 3 which hosts the deduplication object service 3, which had been unavailable for the cluster of nodes has now become available again, such that the similarity groups for the nodes in the cluster need to be rebalanced to take advantage of the capacity of the deduplication object service 3 which returned to availability, such as the transition that occurs between the hash ring 420 depicted by FIG. 4B and the hash ring 440 depicted by FIG. 4C. An availability status can be a position at a particular time of being able to be used or obtained.

Generating the service hash values may be in response to identifying an excessive load associated with any of the identifiers of the deduplication object services. For example, the data protection platform 202 identifies that the deduplication object service 3 has been executing an average of more than 10 k input/output operations per second over the last several minutes, such that some of the similarity groups which have been assigned to the deduplication object service 3 should be offloaded to another deduplication object service which has a lower processing load for an extended period of time. An excessive load can be an amount of work for a machine which is more than normal or desirable.

After service hash values are generated by hashing identifiers of deduplication object services, the deduplication object services are mapped to locations where the corresponding service hash values map on a hash ring, block 504. The system maps deduplication object services to a hash ring. By way of example and without limitation, this can include the data protection platform 202 mapping the deduplication object services 1-4 and their replicas to 12 locations on the hash ring 400 which correspond to the service hash values which were hashed from the identifiers for deduplication object services 1-4 and their replicas, as depicted by FIG. 4A.

A location can be a particular place or position. A hash ring can be a unit circle for data of a fixed size which is mapped from data of an arbitrary size. As described above, the deduplication object services may be associated with replicas, and mapping the deduplication object services to locations on a hash ring may include mapping the replicas to corresponding locations on the hash ring. A replica can be an exact copy of something.

Following the mapping of deduplication object services to a hash ring, a corresponding group hash value is generated by applying a consistent hash function to corresponding group identifiers of multiple similarity groups, block 506. The system hashes the similarity group identifiers to generate group hash values which can be mapped on the hash ring. In embodiments, this can include the data protection platform 202 generating a group hash value by applying a consistent hash function to the identifier of similarity group X, and for each of the identifiers of more than 1,000 similarity groups. A similarity group can be a collection of things that resemble each other. A group hash value can be data of a fixed size which is mapped from data of an arbitrary size which is associated with a collection of things. A group identifier can be a sequence of characters used to refer to a collection of things.

Having generated, for each of multiple similarity groups, a corresponding group hash value by applying a consistent hash function to a corresponding group identifier, each of the multiple similarity groups is assigned to one of the deduplication object services which is mapped to one of the locations, on the hash ring, which is a first successor to a location where the corresponding group hash value maps on the hash ring, thereby enabling each deduplication object service to deduplicate a balanced load of data file segments identified by assigned similarity groups, block 508. The system uses a hash ring to efficiently create affinity-based load-balancing distribution of similarity groups. By way of example and without limitation, this can include the data protection platform 202 assigning similarity group X to deduplication object service 3 replica 2, which is mapped to the location on the hash ring 400 which is the first successor to the group hash value hashed for the similarity group X, as depicted by FIG. 4A. The data protection platform 202 also assigns each of more than 1,000 additional similarity groups to the hash ring 400, and assigns the similarity groups to the deduplication object services 1-4, and their replicas, which is not depicted by FIG. 4A.

After assigning similarity groups to deduplication object services, a node is optionally identified as hosting one of the deduplication object services to which one of the multiple similarity groups has been assigned, block 510. The system can identify a node that hosts a deduplication object service to which a similarity group has just been assigned. In embodiments, this can include the data protection platform 202 identifying that node 3 hosts the deduplication object service 3 which has just been assigned the similarity group X. A node can be a computer that manages access to a centralized resource in a network.

Following the identification of a node that hosts a deduplication object service to which one of the similarity groups has just been assigned, a determination is optionally made whether the node is listed in a node affinity hint as one of many nodes that store metadata for the one of the multiple similarity groups, block 512. The system can determine if the node that stores metadata for a deduplication object service which has just been assigned a similarity group is a node that stores metadata for the similarity group. For example, and without limitation, this can include the data protection platform 202 determining if the node 3 which hosts the deduplication object service 3, which has just been assigned the similarity group X is listed by the node affinity hint as a node that store container metadata for the similarity group X. A node affinity hint can be a suggestion of a beneficial relationship with a specific type of a computer that manages access to a centralized resource in a network. Metadata can be information that describes other information.

If the node identified for a similarity group is not one of many nodes that store metadata for the similarity group, the flowchart 500 continues to block 514 to reassign the similarity group identifier to one of the deduplication object service identifiers that stores metadata for the similarity group. If the node identified for a similarity group is a node that stores metadata for the similarity group, the flowchart 500 proceeds to block 516 to determine whether the node has been assigned the lead node role.

If the node identified for a similarity group is not one of many nodes that store metadata for the similarity group, the one of the similarity groups is optionally reassigned to one of the deduplication object services which is hosted by a node that is listed in the node affinity hint, block 514. The system can reassign a similarity group to a deduplication object service which is hosted by a node that stores metadata for the similarity group. By way of example and without limitation this can include the data protection platform 202 reassigning the similarity group X, to the node 2 because the node 2 is listed in the affinity hints for the similarity group X as storing metadata for the similarity group X, whereas the node 3 to which the similarity group X was initially assigned, is not listed in the affinity hints for the similarity group X as a node that stores metadata for the similarity group X.

Having reassigned one of the similarity groups to one of the deduplication object services which is hosted by a node that is listed in the node affinity hint, a determination is optionally made whether the node that is listed in the node affinity hint is listed as being assigned a leader node role, block 516. The system can determine whether the node that stores metadata for the similarity group has been assigned a leader node role for the similarity group. By way of example and without limitation, this can include the data protection platform 202 determining whether the node 2 has been assigned the leader node role. A leader node role can be a part played by a computer, in a particular situation, by managing access to a centralized resource in a network, and providing initiative to other computers.

If the node that is listed in the node affinity hint is listed as being assigned a leader node role, the flowchart 500 terminates. If the node that is listed in the node affinity hint is not listed as being assigned a leader node role, the flowchart 500 continues to block 518 to co-locate ownership of a similarity group with the leader node role for accessing the similarity group's locally stored metadata.

If the node that is listed in the node affinity hint is not listed as being assigned a leader node role, the leader node role is assigned to the node that is not listed as being assigned a leader node role, block 518. The system can assign the leader node role for the similarity group to the node which already owns the similarity group. In embodiments, this can include the data protection platform 202 assigning the leader node role for the similarity group X to the node 2 which hosts the deduplication object service.

In some of the preceding examples, the data protection platform 202 responded to the deduplication object service 3 returning to availability on a cluster of nodes which had previously balanced the distribution of 1,024 similarity groups equally among the deduplication object services 1, 2, and 4 hosted by the 3 previously available cluster nodes. The data protection platform 202 rebalanced the distribution of the 1,024 similarity groups equally among the deduplication object services 1-4 and their replicas on the 4 available cluster nodes. However, the data protection platform 202 rebalanced the distribution of only the similarity groups that had been previously assigned to the deduplication object service 3, so that these similarity groups would have local access to their stored metadata once again. The data protection platform 202 did not need to reference any records about which of the 1,024 similarity groups were assigned to the deduplication object service 3, or reassign any of the 1,024 similarity groups which have always been assigned to the deduplication object services 1, 2, and 4. After rebalancing the distribution of 1,024 similarity groups between deduplication object services 1-4 and their replicas, each of the deduplication object services 1-4 are enabled to deduplicate a balanced load of data file segments identified by the deduplication object services' assigned similarity groups.

A balanced load can be an equitably distributed amount of work for a machine. A data file segment can be a part of a collection of information stored in a computer's memory or on a storage device under a single identifying name. An assigned similarity group can be an allocated collection of things that resemble each other.

Although FIG. 5A depicts the blocks 502-518 occurring in a specific order, the blocks 502-518 may occur in other orders. In other implementations, each of the blocks 502-518 may also be executed concurrently and/or in combination with other blocks and/or some blocks may be divided into a different set of blocks.

modulo value to identify the node to which the resource will be assigned. For example, since the dividend is 1 for similarity group 1, and the divisor is 4 for the 4 nodes in the cluster, the traditional resource distribution algorithm divides 1 by 4 to produce a quotient of 0 and a remainder of 1, uses the remainder of 1 to identify node 1, and assigns the similarity group 1 to node 1. Likewise, the traditional resource distribution algorithm assigns similarity group 2 (quotient 0 and remainder 2) to node 2, and similarity group 3 (quotient 0 and remainder 3) to node 3.

In a slightly different example depicted below in Table 1, since the dividend is 4 for similarity group 4 and the divisor is 4 for the total number of nodes in the cluster, the traditional resource distribution algorithm divides 4 by 4 to produce a quotient of 1 and a remainder of 0, uses the remainder of 0 to identify node 4, and assigns the similarity group 4 to node 4. Likewise, the traditional resource distribution algorithm assigns similarity group 5 (quotient 1 and remainder 1) to node 1, assigns similarity group 6 (quotient 1 and remainder 2) to node 2, assigns similarity group 7 (quotient 1 and remainder 3) to node 3, and assigns similarity group 8 (quotient 2 and remainder 0) to node 4. Table 1 below depicts examples of a traditional resource distribution algorithm using modular 4 arithmetic operations to assign similarity groups 1-12 to nodes 1-4, with node 1 being assigned the similarity groups 1, 5, and 9; node 2 being assigned the similarity groups 2, 6, and 10; node 3 being assigned the similarity groups 3, 7, and 11; and node 4 being assigned the similarity groups 4, 8, and 12.

TABLE 1

| Node # | Deduplication Object Service # | Node # for (mod 4) | Similarity Group # and value for (mod 4) | Similarity Group # and value for (mod 4) | Similarity Group # and value for (mod 4)# |
| --- | --- | --- | --- | --- | --- |
| 1 | 1 | 1 | 1 = 1 (mod 4) | 5 = 1 (mod 4) | 9 = 1 (mod 4) |
| 2 | 2 | 2 | 2 = 2 (mod 4) | 6 = 2 (mod 4)4 | 10 = 2 (mod 4) |
| 3 | 3 | 3 | 3 = 3 (mod 4) | 7 = 3 (mod 4) | 11 = 3 (mod 4) |
| 4 | 4 | 0 | 4 = 0 (mod 4) | 8 = 0 (mod 4) | 12 = 0 (mod 4)4 |

A Comparison of Example Redistributions of Similarity Groups

As described above, if a cluster node becomes unavailable, the resources that were assigned to the now unavailable node need to be redistributed to the other cluster nodes. A similarity group is a resource which may have been reassigned to a different node or a different deduplication object service for various reasons, such as a node or a deduplication object service being removed from a cluster, for load balancing between nodes, to have local access to metadata, or for other reasons. When a node in a cluster becomes unavailable, a traditional resource distribution algorithm redistributes most of the resources that were assigned to the nodes in a cluster.

For example, a traditional resource distribution algorithm uses modular arithmetic operations to distribute resources to nodes, such as dividing a dividend, which is the identifying number of a resource, by a divisor, which is the total number of nodes in the cluster, to calculate a quotient, which is how many times the divisor can be divided into the dividend, and a remainder, which is what is left after the dividend is divided by the divisor. Then the traditional resource distribution algorithm uses the value of the remainder as the After a node fails, more than 1,000 similarity groups may need to be redistributed before a data protection system can begin deduplicating data again, such that a traditional resource distribution algorithm does not have the time available to sufficiently evaluate individual records for each similarity group to attempt to determine why or where any individual similarity group had been reassigned to a different node. System administrators may prefer for the traditional resource distribution algorithm to use a simple procedure to redistribute similarity groups as quickly as possible to minimize down-time. As depicted below in Table 2, when the cluster of 4 nodes loses communication with node 4, the traditional resource distribution algorithm redistributes the similarity groups based on dividing the dividend of each similarity group number by the new divisor of 3, which is the new number of nodes in the cluster. These redistributions are depicted below with node 1 being assigned the similarity groups 1, 4, 7, and 10; node 2 being assigned the similarity groups 2, 5, 8, and 11; and node 3 being assigned the similarity groups 3, 6, 9, and 12, and so on.

TABLE 2

| Node # | De-duplication Object Service # | Node # for (mod3) | Similarity Group # and value for (mod 3) | Similarity Group # and value for (mod 3) | Similarity Group # and value for (mod 3)# | Similarity Group # and value for (mod 3)# |
|---|---|---|---|---|---|---|
| 1 | 1 | 1 | 1 = 1 (mod 3) | 4 = 1 (mod 3) | 7 = 1 (mod 3) | 10 = 1 (mod 3) |
| 2 | 2 | 2 | 2 = 2 (mod 3) | 5 = 2 (mod 3) | 8 = 2 (mod 3) | 11 = 2 (mod 3) |
| 3 | 3 | 0 | 3 = 0 (mod 3) | 6 = 0 (mod 3) | 9 = 0 (mod 3) | 12 = 0 (mod 3) |
| 4 | | | | | | |

A comparison of the assignments of the similarity groups 1-12 to the 4-node cluster against the reassignments of similarity groups 1-12 to the 3-node cluster determines that the first 3 similarity groups 1-3 are assigned to nodes numbered 1-3 for both the 4-node cluster and for the 3-node cluster. However, the next 9 similarity groups 4-12 are assigned to different numbered nodes in the 4-node cluster and the 3-node cluster, such as similarity group 4 being assigned to node 4 in the 4-node cluster and similarity group 4 being assigned to node 1 in the 3-node cluster. Following the sequence of 9 similarity groups 4-12 that are assigned to different numbered nodes in the 4-node cluster and the 3-node cluster, is another sequence of 3 similarity groups 13-15 that are assigned to the same numbered nodes 1-3 in the 4-node cluster and in the 3-node cluster, and another sequence of 9 similarity groups 16-24 that are assigned to different numbered nodes in the 4-node cluster and in the 3-node cluster. This pattern of 3 consecutively numbered similarity groups being assigned to the same numbered nodes in the 2 clusters followed by 9 consecutively numbered similarity groups being assigned to different numbered nodes in the 2 clusters can continue indefinitely through the 1,024 similarity groups and beyond. Consequently, each of these indefinite number of sequential blocks of 12 consecutively numbered similarity groups includes 3 consecutively numbered similarity groups that remain assigned to the same numbered nodes in the 2 clusters, and 9 consecutively numbered similarity groups that are reassigned to different numbered nodes in the 2 clusters.

Therefore, only 3 of every 12 assignments of similarity groups to nodes 1-4 will remain unchanged, while 9 of every 12 assignments of similarity groups to nodes 1-4 will be changed. Dividing the 3 assignments that will remain unchanged by 12 total assignments results in only 25% of assignments of similarity groups remaining unchanged, which means that 75% of assignments of similarity groups will be changed. Thus, a traditional resource distribution algorithm redistributes 75% of the similarity groups which were locally hosted by cluster nodes, where inexpensive local access had been available, to remote cluster nodes, where expensive remote procedure calls would be required.

As depicted below in Table 3, the disclosed system uses non-integer hash values of multiple replicas of deduplication object services to determine the assignment of similarity groups to nodes. For example, since the next value on the hash ring, or the successor value, which follows the hashed value of 0.32 for similarity group 1 is the successor value of 0.46, from the list of the successor values of 0.46, 2.05, 4.71 for node 1, then the similarity group 1 is assigned to node 1.

TABLE 3

| Node # | Deduplication Object Service # | Node # for (mod 2Π) | Similarity Group # and # for (mod 2Π) | Similarity Group # and # for (mod 42Π) | Similarity Group # and # for (mod 2Π) |
|---|---|---|---|---|---|
| 1 | 1 | 0.46, 2.05, 4.71 | 1 = 0.32(mod 2Π) | 5 = 1.85(mod 2Π) | 9 = 4.39(mod 2Π) |
| 2 | 2 | 0.99, 3.11, 5.24 | 2 = 4.90(mod 2Π) | 6 = 0.83(mod 2Π) | 10 = 2.87(mod 2Π) |
| 3 | 3 | 1.52, 4.18, 5.77 | 3 = 3.88(mod 2Π) | 7 = 5.51(mod 2Π) | 11 = 1.34(mod 2Π) |
| 4 | 4 | 2.58, 3.65, 6.28 | 4 = 2.36(mod 2Π) | 8 = 3.37(mod 2Π) | 12 = 5.92(mod 2Π) |

As depicted below in Table 4, the loss of node 4 from the cluster of 4 nodes triggers the similarity group distribution algorithm to apply a consistent hash function to all of the cluster's similarity groups, However, applying the consistent hash function to the similarity groups assigned to the available nodes 1-3 will result in the same assignments for these same similarity groups to the same nodes 1-3, while applying the consistent hash function to the similarity groups assigned to the now unavailable node 4 will result in the reassignments for these similarity groups to the available nodes 1-3. For example, since the hashed value of 5.51 for similarity group 7 still has the successor value of 5.77, as identified from the list of the successor values of 1.52, 4.18, 5.77 for node 3, then the similarity group 7 will remain assigned to node 3. Likewise, all of the similarity groups that were assigned to the nodes 1-3 will remain assigned to the same nodes, whereas only the similarity groups that were assigned to the unavailable node 4 will be redistributed to the available nodes 1-3.

For example, the hashed value of 2.36 for similarity group 4 used to have the successor value of 2.58 for node 4, but since node 4 is unavailable, the successor value for 2.36 is now 3.11, which is 1 of the 3 hashed values listed for available node 2 and its replicas, which means that similarity group 4 will be reassigned to the available node 2 instead of the unavailable node 4. Likewise, the hashed value of 3.37 for similarity group 8 used to have the successor value of 3.65 for node 4, but since node 4 is unavailable, the successor value for 3.37 is now 4.18, which is 1 of the 3 hashed values listed for available node 2 and its replicas, which means that similarity group 8 will be reassigned to the available node 3 instead of the unavailable node 4. Similarly, the hashed value of 5.92 for similarity group 12 used to have the successor value of 6.28 for node 4, but since node 4 is unavailable, the successor value for 5.92 is now the wraparound value of 0.46, which is 1 of the 3 hashed values listed for the available node 1, which means that similarity group 12 is reassigned to available node 1 instead of the unavailable node 4.

TABLE 4

| Node # | Deduplication Object Service # | Node # for (mod 2Π) | Similarity Group # and # for (mod 2Π) | Similarity Group # and # for (mod 42Π) | Similarity Group # and # for (mod 2Π) |
|---|---|---|---|---|---|
| 1 | 1 | 0.46, 2.05, 4.71 | 1 = 0.32(mod 2Π) | 5 = 1.85(mod 2Π) | 9 = 4.39(mod 2Π) |
| 2 | 2 | 0.99, 3.11, 5.24 | 2 = 4.90(mod 2Π) | 6 = 0.83(mod 2Π) | 10 = 2.87(mod 2Π) |
| 3 | 3 | 1.52, 4.18, 5.77 | 3 = 3.88(mod 2Π) | 7 = 5.51(mod 2Π) | 11 = 1.34(mod 2Π) |
| 4 | | | 4 = 2.36(mod 2Π) | 8 = 3.37(mod 2Π) | 12 = 5.92(mod 2Π) |
| | | Redistribution from node 4 | (Node 2 instead of node 4) | (Node 3 instead of node 4) | (Node 1 instead of node 4) |

The data protection platform 202 redistributes only the similarity groups that were previously assigned to the now unavailable node 4, while each of the similarity groups that were assigned to nodes 1-3 remain assigned to the same node. Since the data protection platform 202 redistributed similarity groups for only 1 node (node 4) of the similarity groups for 4 nodes (nodes 1-4), only 25% (1 divided by 4=25%) of similarity groups were redistributed, such that the nodes 1-4 retained the remaining 75% or their similarity groups.

Exemplary Computing System

Figure 6:
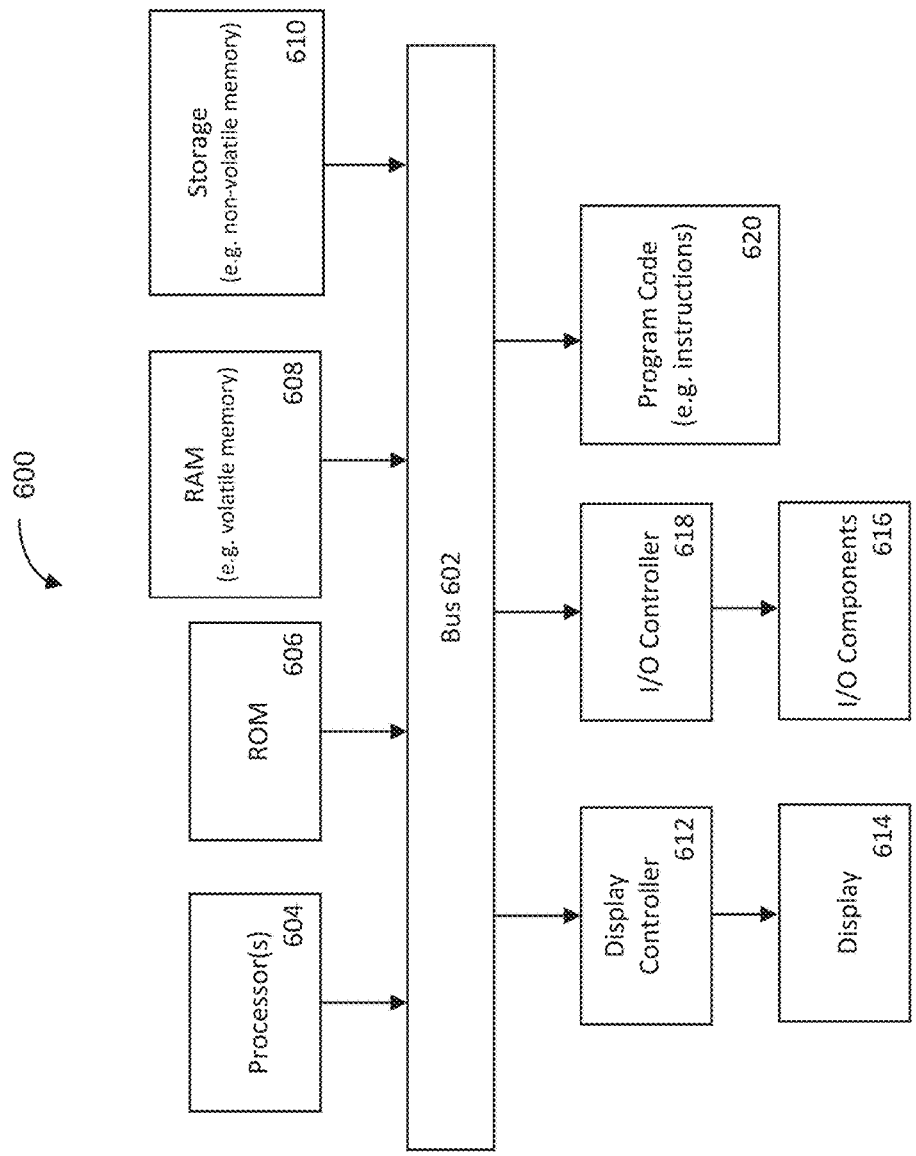
FIG. 6 is a block diagram illustrating a computing system for an affinity-based load-balancing distribution of similarity groups according to one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 602 which may be coupled to a processor 604, ROM (Read Only Memory) 606, RAM (or volatile memory) 608, and storage (or non-volatile memory) 610. The processor(s) 604 may retrieve stored instructions from one or more of the memories 606, 608, and 610 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 604 may perform operations in an on-demand or "cloud computing" environment or as a service, such as within a "software as a service" (SaaS) implementation. Accordingly, the performance of operations may be distributed among the one or more processors 604, whether residing only within a single machine or deployed across a number of machines. For example, the one or more processors 604 may be located in a single geographic location (such as within a home environment, an office environment, or a server farm), or may be distributed across a number of geographic locations.

The RAM 608 may be implemented as, for example, dynamic RAM (DRAM), or other types of memory that require power continually in order to refresh or maintain the data in the memory. Storage 610 may include, for example, magnetic, semiconductor, tape, optical, removable, non-removable, and other types of storage that maintain data even after power is removed from the distributed file system. It should be appreciated that storage 610 may be remote from the distributed file system, such as accessible via a network.

A display controller 612 may be coupled to the bus 602 in order to receive display data to be displayed on a display device 614, which can display any one of the user interface features or embodiments described herein and may be a local or a remote display device. The computing system 600 may also include one or more input/output (I/O) components 616 including mice, keyboards, touch screen, network interfaces, printers, speakers, and other devices. Typically, the input/output components 616 are coupled to the distributed file system through an input/output controller 618.

Program code 620 may represent any of the instructions, applications, software, libraries, toolkits, modules, components, engines, units, functions, logic, etc. as described herein. Program code 620 may reside, completely or at least partially, within the memories described herein (such as non-transitory computer-readable media), or within a processor during execution thereof by the computing system. Program code 620 may include both machine code, such as produced by a compiler, and files containing higher-level or intermediate code that may be executed by a computing system or other data processing apparatus (or machine) using an interpreter. In addition, program code 620 may be implemented as software, firmware, or functional circuitry within the computing system, or as combinations thereof. Program code 620 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for affinity-based load-balancing distribution of similarity groups, the system comprising:
   one or more processors; and
   a non-transitory computer readable medium storing a plurality of instructions, which when executed, cause the one or more processors to:
   generate service hash values by applying a consistent hash function to identifiers of deduplication object services;
   map the deduplication object services to locations where the service hash values map on a hash ring;
   generate, for each of multiple similarity groups, a corresponding group hash value by applying the consistent hash function to a corresponding group identifier;
   assign, each of the multiple similarity groups, to one of the deduplication object services which is mapped to one of the locations on the hash ring which is a first successor to a location where the corresponding group hash value maps on the hash ring, thereby enabling each deduplication object service to deduplicate a balanced load of data file segments identified by assigned similarity groups; and
   deduplicate, by a deduplication object service of the deduplication object services, a group of data file segments identified by a similarity group assigned to the deduplication object service.

2. The system of claim 1, generating the service hash values is in response to an additional identifier of a deduplication object service being associated with an unavailability status.

3. The system of claim 1, wherein generating the service hash values is in response to one of the identifiers of deduplication object services becoming associated with an availability status.

4. The system of claim 1, wherein generating the service hash values is in response to identifying an excessive load associated with any of the identifiers of the deduplication object services.

5. The system of claim 1, comprising further instructions, which when executed, cause the one or more processors to:
   identify a node which hosts one of the deduplication object services to which one of the multiple similarity groups has been assigned; and
   determine whether the node is listed in a node affinity hint as one of many nodes that store metadata for the one of the multiple similarity groups.

6. The system of claim 5, comprising further instructions, which when executed, cause the one or more processors to:
   reassign the one of the similarity groups to one of the deduplication object services which is hosted by a node that is listed in the node affinity hint, in response to a determination that the node is not listed in the node affinity hint as one of many nodes that store metadata for the one of the multiple similarity groups;
   determine whether the node that is listed in the node affinity hint is listed as being assigned a leader node role; and
   assign the leader node role to the node that is not listed as being assigned a leader node role, in response to a determination that the node that is listed in the node affinity hint is listed as being assigned a leader node role.

7. The system of claim 1, wherein the deduplication object services are associated with replicas, and mapping the deduplication object services to locations on the hash ring comprises mapping the replicas to corresponding locations on the hash ring.

8. A computer program product comprising a non-transitory computer-readable medium having a computer-readable program code embodied therein to be executed by one or more processors, the program code including instructions to:
   generate service hash values by applying a consistent hash function to identifiers of deduplication object services;
   map the deduplication object services to locations where the service hash values map on a hash ring;
   generate, for each of multiple similarity groups, a corresponding group hash value by applying the consistent hash function to a corresponding group identifier;
   assign, each of the multiple similarity groups, to one of the deduplication object services which is mapped to one of the locations on the hash ring, which is a first successor to a location where the corresponding group hash value maps on the hash ring, thereby enabling each deduplication object service to deduplicate a balanced load of data file segments identified by assigned similarity groups; and
   deduplicate, by a deduplication object service of the deduplication object services, a group of data file segments identified by a similarity group assigned to the deduplication object service.

9. The computer program product of claim 8, wherein generating the service hash values is in response to an additional identifier of a deduplication object service being associated with an unavailability status.

10. The computer program product of claim 8, wherein generating the service hash values is in response to one of the identifiers of deduplication object services becoming associated with an availability status.

11. The computer program product of claim 8, wherein generating the service hash values is in response to identifying an excessive load associated with any of the identifiers of the deduplication object services.

12. The computer program product of claim 8, wherein the program code includes further instructions to:
   identify a node which hosts one of the deduplication object services to which one of the multiple similarity groups has been assigned; and determine whether the node is listed in a node affinity hint as one of many nodes that store metadata for the one of the multiple similarity groups.

13. The computer program product of claim 12, wherein the program code includes further instructions to;
reassign the one of the similarity groups to one of the deduplication object services which is hosted by a node that is listed in the node affinity hint, in response to a determination that the node is not listed in the node affinity hint as one of many nodes that store metadata for the one of the multiple similarity groups;
determine whether the node that is listed in the node affinity hint is listed as being assigned a leader node role; and
assign the leader node role to the node that is not listed as being assigned a leader node role, in response to a determination that the node that is listed in the node affinity hint is listed as being assigned a leader node role.

14. The computer program product of claim 8, the deduplication object services are associated with replicas, and mapping the deduplication object services to locations on the hash ring comprises mapping the replicas to corresponding locations on the hash ring.

15. A computer-implemented method for an affinity-based load-balancing distribution of similarity groups, comprising:
generating service hash values by applying a consistent hash function to identifiers of deduplication object services;
mapping the deduplication object services to locations where the service hash values map on a hash ring;
generating, for each of multiple similarity groups, a corresponding group hash value by applying the consistent hash function to a corresponding group identifier;
assigning, each of the multiple similarity groups, to one of the deduplication object services which is mapped to one of the locations on the hash ring which is a first successor to a location where the corresponding group hash value maps on the hash ring, thereby enabling each deduplication object service to deduplicate a balanced load of data file segments identified by assigned similarity groups; and
deduplicating, by a deduplication object service of the deduplication object services, a group of data file segments identified by a similarity group assigned to the deduplication object service.

16. The computer-implemented method of claim 15, wherein generating the service hash values is in response to one of an additional identifier of a deduplication object service being associated with an unavailability status, or one of the identifiers of deduplication object services becoming associated with an availability status.

17. The computer-implemented method of claim 15, wherein generating the service hash values is in response to identifying an excessive load associated with any of the identifiers of the deduplication object services.

18. The computer-implemented method of claim 15, wherein the computer-implemented method further comprises:
identifying a node which hosts one of the deduplication object services to which one of the multiple similarity groups has been assigned; and
determining whether the node is listed in a node affinity hint as one of many nodes that store metadata for the one of the multiple similarity groups.

19. The computer-implemented method of claim 15, wherein the computer-implemented method further comprises:
reassigning the one of the similarity groups to one of the deduplication object services which is hosted by a node that is listed in the node affinity hint, in response to a determination that the node is not listed in the node affinity hint as one of many nodes that store metadata for the one of the multiple similarity groups;
determining whether the node that is listed in the node affinity hint is listed as being assigned a leader node role; and
assigning the leader node role to the node that is not listed as being assigned a leader node role, in response to a determination that the node that is listed in the node affinity hint is listed as being assigned a leader node role.

20. The computer-implemented method of claim 15, the deduplication object services are associated with replicas, and mapping the deduplication object services to locations on the hash ring comprises mapping the replicas to corresponding locations on the hash ring.

\* \* \* \* \*